G. H. PARISH.
CAMERA.
APPLICATION FILED JAN. 20, 1917.

1,281,998.

Patented Oct. 15, 1918.
2 SHEETS—SHEET 1.

Inventor:
Gertrude H. Parish,
by: Howard Fischer
her Attorney.

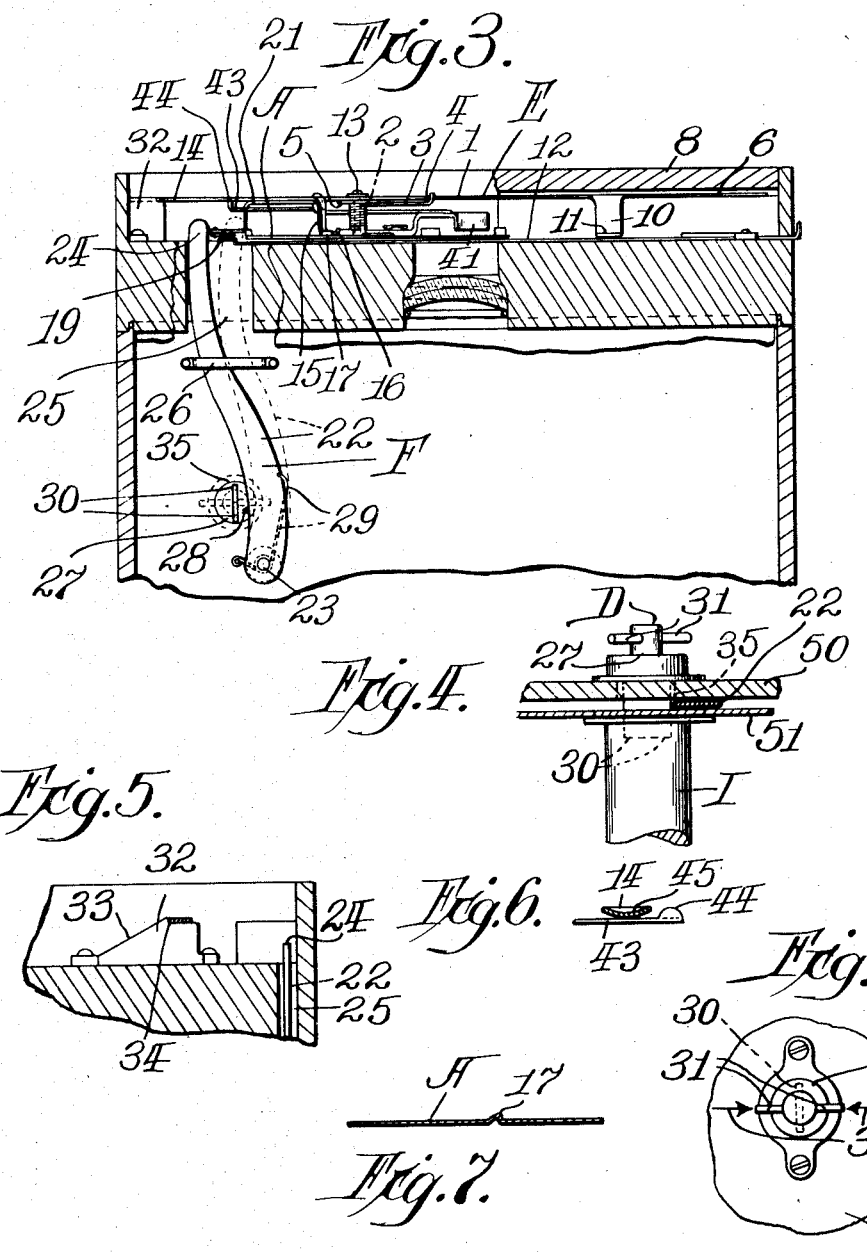

UNITED STATES PATENT OFFICE.

GERTRUDE H. PARISH, OF ST. PAUL, MINNESOTA.

CAMERA.

1,281,998.  Specification of Letters Patent.  Patented Oct. 15, 1918.

Application filed January 20, 1917. Serial No. 143,427.

*To all whom it may concern:*

Be it known that I, GERTRUDE H. PARISH, a citizen of the United States, residing at St. Paul, in the county of Ramsey and State of Minnesota, have invented a new and useful Improvement in Cameras, of which the following is a specification.

My invention relates to cameras to avoid double exposures of the plate or film in the camera, thereby preserving pictures which are often spoiled or lost by two exposures on one film.

The advantage of this device will be realized in taking into consideration the fact that often the picture or pictures that are spoiled when a double exposure is made on one film, just happens to be the very picture that one wishes to preserve or that it is impossible to get again.

The primary object of my device is to have the mechanism so arranged that a second exposure is practically impossible on a film that is already exposed by locking the shutter after the film is exposed and not releasing the shutter until a new film has been brought into position for a second exposure.

It is also an object of my device to shut off the view finders at the same time the shutter of the camera is locked so that it is impossible to see pictures in the view finders of the camera until a new film or plate is brought into position for an exposure.

It is an object of my invention to have the locking means and view finder shutter work automatically with the operation of the camera shutter and at the same time to have a simple inexpensive construction which is not apt to get out of order.

Other features and advanages of my device will be more clearly set forth in the following specification and claims:

In the drawing, which forms part of this specification:

Fig. 3 is a cross section of Fig. 1 taken on the line X—X and illustrating part of the inside of the camera removed.

Fig. 4 is a detail of the ordinary winding mechanism.

Fig. 5 is a detail view taken on the line Z—Z of Fig. 2.

Fig. 6 is a view taken on the line Y—Y of Fig. 1 illustrating a detail of part of the mechanism.

Fig. 7 is a cross section illustrating a detail of the parts of the camera.

Fig. 8 is a detail portion of the winding lever.

Figure 1:
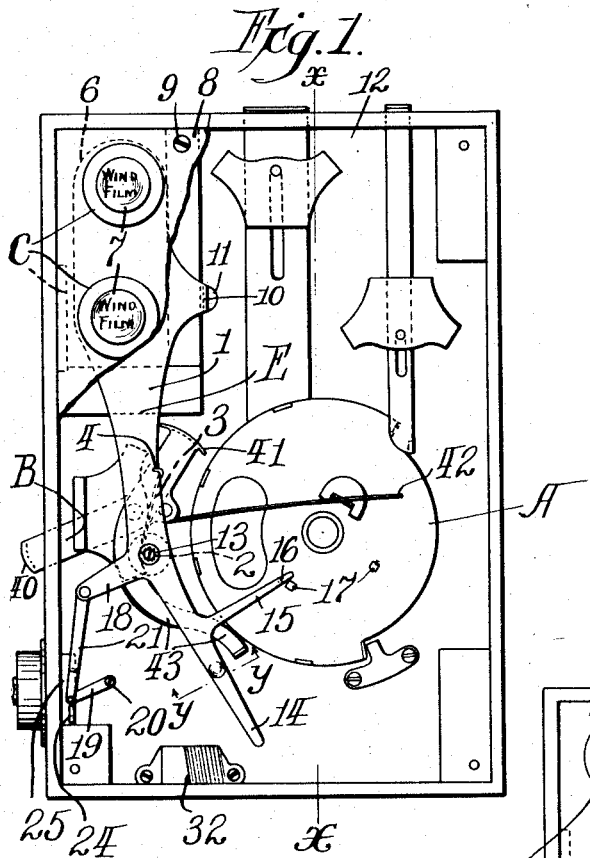
Figure 1 is a front view of a camera, having part of the front cover removed and illustrating my device attached thereto.

In the drawing, A illustrates the ordinary oscillatory shutter as is used in cameras and B the shutter operating mechanism which is adapted to oscillate the shutter in taking a picture. C illustrates the view finders which are of the ordinary construction and D illustrates the winding lever or mechanism which is of the ordinary construction and is used in winding the film in position for different exposures.

E illustrates the shutter and locking device which is preferably formed from a thin piece of sheet metal 1, which is freely pivoted on the shaft or pin 2 just a little to one side of the shutter operating mechanism. A coil spring 3 is secured to the pin 2 on one end and coiled around the same and the other end 4 is bent over the edge of the shutter E so as to bear against the plate 1 and tend to hold the shutter and locking mechanism E in the position illustrated in Fig. 1. A washer 5 is rigidly secured to the pin 2 and forms a bearing surface for the lower side of the shutter or plate 1.

The upper portion of the plate 1 is shaped so as to form a shutter 6 which covers or shuts off the lenses 7 of the view finders C from illustrating the picture or object which is to be photographed when the shutter mechanism is in the position illustrated in Fig. 1. The shutter mechanism is adapted to operate just inside the front cover 8 of the camera, only that portion of the cover being shown which carries the lenses 7 of the view finders. The cover 8 is of the ordinary construction being held in position by the ordinary screws 9 so as to leave sufficient space for the operation of the mechanism E above the shutter A and its operating mechanism B.

A stop 10 is formed on one side of the shutter 6 of the plate 1 so as to hold the shutter in the position illustrated in Fig. 1. The lower end of the stop 10 is bent outward to form a rest 11 which bears on the surface 12 of the front of the camera so that when the shutter 6 is moved away from the lenses 7, the rest 11 forms a brace to hold the shutter and plate 1 parallel with the surface 12 of the camera when the shutter 6 is operated.

The plate or shutter mechanism E is freely held in position on the pin 2 by means of the screw 13 which is threaded into the pin 2.

The lower end of the plate 1 is formed with a projecting arm 14 which has a finger 15 formed integral therewith, having a downwardly projecting portion 16 on its free end. When the finger 15 is held in the position illustrated in Fig. 1, its downwardly projecting end 16 will be in position over the shutter A so as to engage with the upwardly projecting lugs 17 formed on the shutter A. Thus when the shutter 6 and plate 1 are in the position illustrated in Fig. 1, the shutter A of the camera is locked against oscillation by the finger 15 which lies in the path of oscillation of the lugs 17 and the view or object is shut off from the view finders by the shutter 6.

A short arm 18 is formed integral with the plate 1 and is adapted to be pivotally connected by the link 21 to the arm 19 which is pivoted at 20 on the surface or front of the camera 12. The arm 19 and the link 21 are adapted to connect with an operating mechanism F which is pivotally secured in the camera.

The mechanism F consists of an arm 22 which is pivoted at 23 to the wall of the camera and the free end 24 of which is adapted to project through the slot 25 and engage with the ends of the arm 19 and the link 21 to operate the same. The lever or arm 22 is adapted to be held by the band 26 which is secured to the camera wall and holds the end of the arm 22 against the inner wall. The band 26 also limits the movement back and forth of the arm 22 during the operation. A coil spring 29 which is coiled about the pivot point 23 has one end secured to the wall of the camera and the other end bearing against the lever or arm 22 to hold the same in backward position against the side of the band 26 as is illustrated in Fig. 3.

The lugs 30 which are secured and project from the cylindrical surface 27 of the winding mechanism are adapted to engage the spool I in the usual manner to wind up the film when the arms 31 of the winding mechanism are engaged. The lugs 30 are also adapted to engage the edge 28 of the arm 22 so that when the film is being wound the lugs act as cams to operate the arm over into the position illustrated in Fig. 3 in dotted outline. When the lever 22 is moved in the position illustrated in dotted outline, its free end 24 will engage the arm 19 and the link 21 will be moved upward turning the plate 1 on its pivot and forcing the shutter 6 away from the lenses 7, at the same time moving the arm 14 into the position illustrated in Fig. 2 so as to engage the catch 32 and thereby hold the mechanism E in the position illustrated in Fig. 2, the catch 32 being formed with an inclined surface 33 which is adapted to engage the end of the arm 14 and elevate it sufficiently to catch in the notch 34 of the catch 32 to hold the arm 14.

When the camera is taken apart to put in a new film, the lugs 30 are withdrawn from the slot in the spool I into the opening 35 and the band 26 holds the arm 22 in place as it is withdrawn from the slot 25. When the camera is put back together, the arm 22 is positioned between the outer wall 50 of the camera and the inner wall 51 of the film holding means of the camera as is illustrated in Fig. 4.

The arms 31 of the winding mechanism D being placed in the position illustrated in Figs. 3 and 8 so that the lugs 30 will not engage the edge 28 of the arm 22 which projects over the opening 35. In putting in a new film or in winding the film from one number to another, it is essential to have the arms 31 of the winding mechanism stop in the position in line with the arrows 39 which are marked on the outer surface of the camera as is illustrated in Fig. 8. Thus always leaving the leved or arm 22 in backward position as is illustrated in full lines in Fig. 3. The arm 22 in backward position as illustrated in Fig. 3 leaves the mechanism E in readiness for operation to be set into the position illustrated in Fig. 2 or released into the position illustrated in Fig. 1.

Figure 2:
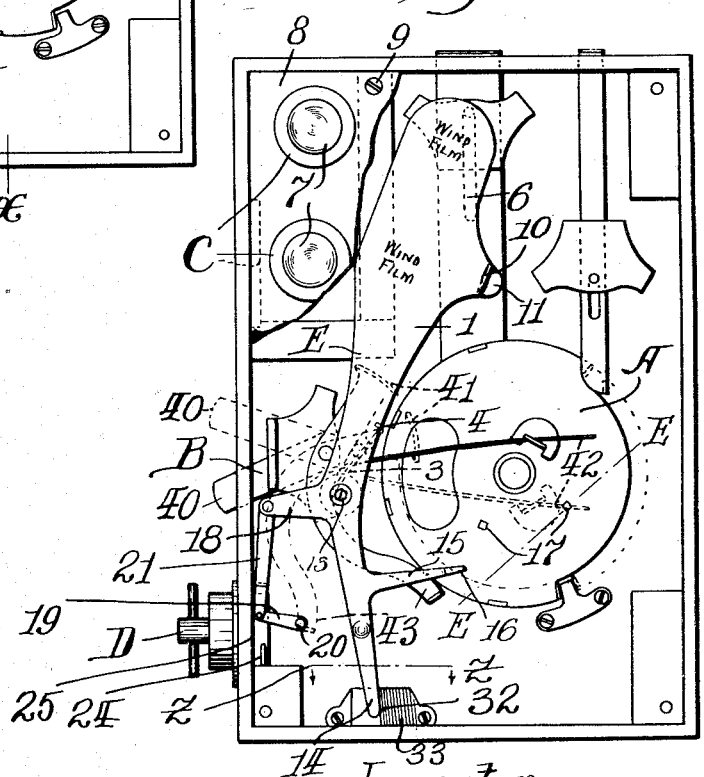
Fig. 2 is a similar view to Fig. 1, showing the parts in a different position.

The operating mechanism B for the shutter A, is composed of an operating lever 40, escapement 41 and spring lever 42 which is attached to the shutter and is of ordinary construction. Rigidly secured to the escapement end of the lever 40, is an arm 43 which is held in a plane parallel to and directly under the plate 1 and arm 14 so that during the operation of the lever 40, in releasing the shutter A from one position to another, the arm 43 will pass back and forth under the arm 14. The free end of the arm 43 is bent upward to form a semi-circular engaging portion 44 and the arm 14 has a circular depressed portion 45 against which the portion 44 of the lever 43 is adapted to engage when passing under the arm 14 during the operation of the lever 40 and shutter A. Thus when a new film has been wound into position for exposure, the arm 22 will release or set the shutter 6 with the arm 14 engaging the catch 32 as illustrated in Fig. 2. The view finders are then open ready for use and the finger 15 withdrawn from the lugs 17 leaving the shutter A ready for operation by means of the lever 40. When the lever 40 is operated, the arm 43 will pass under the arm 14, the portion 44 of the arm 43 engaging the portion 45 of the arm 14 raising the free end of the arm 14 and releasing the same from the catch 32, whereupon the spring 3 will carry the shutter 6 and mechanism E back into the position illustrated in Fig. 1. The view finders are then closed by the shutter 6 and the shutter A of the camera is locked by the finger 15 which engages with one of the lugs 17 on the shutter A. Two of these lugs being illustrated so that in either extreme position of the shutter A, the finger 15 will engage with either of the lugs.

Before a picture can then be taken with the camera, it is necessary to wind the film, which is not illustrated, by means of the winding mechanism D leaving the arms 31 in the position illustrated in Fig. 8. During the winding of the film, the lugs 30 will have engaged the arm 22 opening the shutter 6 and releasing the finger 15 with the arm 14 in the catch 32 as is illustrated in Fig. 2, whereupon a new exposure can be made which automatically locks the shutter A and closes the view finders C. The rewinding of the film to a new sensitized portion of the same, resets the mechanism E. This is repeated until the entire film has been exposed. It is obvious the winding mechanism can be changed or made automatic, so as to at all times engage or disengage with the mechanism E through the lever 22 or other suitable means and that the mechanism E which consists of the shutter 6, arms 14 and link 18, and finger 15 can be changed so as to be adapted to different styles of cameras.

With the mechanism shown in my device, it is clearly illustrated that it would be practically impossible to make a double exposure on one sensitized medium, thereby doing away with the annoying feature of the present construction of cameras where double exposures are continually made. By slight variations, my device can be adapted to the plate as well as the film cameras and for convenience, the shutter 6 can be marked on its surface so that when it is in the position illustrated in Fig. 1, it will appear through the lenses 7 so as to read "Wind film".

Thus in the use of the camera after an exposure has been made and the operator wishes to make a new exposure, he will find it impossible to see the picture in the view-finder as the view-finder will be closed and upon examination should he look into the view-finder lenses he will be reminded to wind the film as the wording "Wind film" will appear therethrough.

After an exposure has been made and the view-finder shutter is in closed position, the shutter A is locked by means formed integral with the view-finder shutter making it impossible to make an exposure until the winding mechanism has been rotated sufficiently to reset the view-finder shutter and release the shutter A so that it can be operated by the lever B when it is desired.

The winding mechanism D resets the view-finder shutter when it has been turned a short distance and it is obvious that the person using the camera will continue to rotate the winding mechanism after he has once started to operate the same until a new film is in position to be exposed. In this manner the user of the camera is always reminded to rewind the film before making a new exposure.

In accordance with the patent statutes, I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

I claim—

1. In a camera having a lens shutter, means for holding a series of sensitized surfaces, means for successively bringing said sensitized surfaces into position for exposures, a view finder shutter having means for locking said lens shutter when said view finder shutter is closed, and a lever connected with the means for moving said sensitized surfaces so as to open said view finder shutter and unlock said lens shutter when a new sensitized surface is in position for exposure in said camera.

2. In a camera having a lens shutter, a shutter for automatically shutting off the view in the view finders of said camera and means for simultaneously locking said lens shutter when an exposure is made, means for automatically opening said view finder shutter and simultaneously releasing said lens shutter when a new sensitized surface is brought into position for exposure in said camera.

3. In combination with a camera having a lens shutter and operating means, a view finder shutter, an arm connected to said view finder shutter to hold it in open position, a catch for engaging said arm, a lever secured to said lens shutter operating means which is adapted to engage said arm to release said view finder shutter into closed position automatically when an exposure is made with said camera and means for setting said view finder shutter in open position when a new sensitized surface is in position for exposure in said camera.

4. In combination with a camera having a lens shutter and operating means, a view finder shutter, an arm connected to said view finder shutter to hold it in open position, a catch for engaging said arm, a lever secured to said lens shutter operating means which is adapted to engage said arm to release said view finder shutter into closed position automatically when an exposure is made with said camera, and a finger formed on said arm which is adapted to engage a lug which is formed on said lens shutter thereby locking said lens shutter in closed position until said view finder shutter is released into open position to prevent double exposure of a sensitized film in said camera.

5. In combination with a camera having a lens shutter, means for operating said shutter, a view finder shutter, an arm connected to said view finder shutter to hold it in open position, a catch for engaging said arm, a lever secured to said lens shutter operating means which is adapted to engage said arm to release said view finder shutter into closed position automatically when an exposure is made with said camera, and a lever detachably connected with said view finder shutter which is adapted to re-set said view finder shutter into open position when a new sensitized film is brought into position for exposure in said camera.

6. In a camera having a view-finder shutter and a lens shutter, operating means for said lens shutter, means formed on said operating means for releasing said view-finder shutter into closed position and means formed integral with said view-finder shutter for engaging said lens shutter to lock said lens shutter against operation.

7. In a camera having view-finder and lens shutters, means for operating said lens shutter when said view-finder shutter is in open position, means formed on said lens shutter operating means for releasing said view-finder shutter, spring means connected to said view-finder shutter for moving the same into closed position when said view-finder shutter is released, means formed integral with said view-finder shutter to lock said lens shutter when said view-finder shutter is in closed position and means connected with the winding mechanism of said camera for resetting said view-finder shutter in open position and simultaneously disengaging said locking means from said lens shutter, for the purposes specified.

GERTRUDE H. PARISH.